United States Patent
Gurumurthi et al.

(10) Patent No.: US 11,657,004 B2
(45) Date of Patent: May 23, 2023

(54) METHOD AND SYSTEM FOR MEMORY ATTACK MITIGATION

(71) Applicant: Advanced Micro Devices, Inc., Santa Clara, CA (US)

(72) Inventors: Sudhanva Gurumurthi, Austin, TX (US); Vilas K. Sridharan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/125,978

(22) Filed: Dec. 17, 2020

(65) Prior Publication Data
US 2022/0197827 A1    Jun. 23, 2022

(51) Int. Cl.
*G06F 12/14* (2006.01)
*G06F 12/1009* (2016.01)
*G06F 21/79* (2013.01)
*G06F 12/0871* (2016.01)
*G06F 12/0882* (2016.01)

(52) U.S. Cl.
CPC ...... *G06F 12/1433* (2013.01); *G06F 12/0871* (2013.01); *G06F 12/0882* (2013.01); *G06F 12/1009* (2013.01); *G06F 21/79* (2013.01)

(58) Field of Classification Search
CPC .. G06F 21/79; G06F 12/1009; G06F 12/1433; G06F 12/0871; G06F 12/0882
USPC ........................................................ 711/163
See application file for complete search history.

(56) References Cited

U.S. PATENT DOCUMENTS

| | | | |
|---|---|---|---|
| 9,824,754 B2 * | 11/2017 | Mandava | G06F 12/10 |
| 2012/0254816 A1 | 10/2012 | Brink et al. | |
| 2014/0281206 A1 * | 9/2014 | Crawford | G11C 11/406 |
| | | | 711/106 |
| 2014/0281207 A1 * | 9/2014 | Mandava | G11C 14/0009 |
| | | | 711/106 |
| 2015/0199466 A1 | 7/2015 | Basu et al. | |
| 2016/0180899 A1 | 6/2016 | Kilmer et al. | |
| 2016/0224262 A1 | 8/2016 | Mandava et al. | |
| 2020/0012600 A1 * | 1/2020 | Konoth | G06F 21/577 |

FOREIGN PATENT DOCUMENTS

KR    10-2019-0128890 A    11/2019

OTHER PUBLICATIONS

Mutlu, O., & Kim, J. S., "RowHammer: A Retrospective", arXiv:1904.09724v1, arXiv, 16 pgs., Apr. 22, 2019.
Kim, J. S., et. al., "Revisiting RowHammer: An Experimental Analysis of Modem DRAM Devices and Mitigation Techniques", 47th Annual International Symposium on Computer Architecture, IEEE, 14 pgs., 2020.
Frigo, P., et. al. "TRRespass: Exploiting the Many Sides of Target Row Refresh", arXiv:2004.01807v1, arXiv, 16 pgs., Apr. 3, 2020.

\* cited by examiner

*Primary Examiner* — Hua J Song
(74) *Attorney, Agent, or Firm* — Volpe Koenig

(57) ABSTRACT

A method and system for memory attack mitigation in a memory device includes receiving, at a memory controller, an allocation of a page in memory. One or more device controllers detects an aggressor-victim set within the memory. Based upon the detection, an address of the allocated page is identified for further action.

20 Claims, 3 Drawing Sheets

METHOD AND SYSTEM FOR MEMORY ATTACK MITIGATION

BACKGROUND

Current and future memories (e.g., dynamic random access memory (DRAM)) are susceptible to a variety of memory failures such as rowhammer that can impact the security of systems. Modern DRAM devices use proprietary internal algorithms to track aggressor-victim row pairs to manage rowhammer, with little or no insight to the host. However, vendor-implemented rowhammer mechanisms can be circumvented. One of the ways attacks exploit rowhammer is to look for potential aggressor-victim pairs in memory pages allocated to their process/VM, potentially via side-channels, and use that information to carry out an exploit that impacts the entire system.

BRIEF DESCRIPTION OF THE DRAWINGS

A more detailed understanding can be had from the following description, given by way of example in conjunction with the accompanying drawings wherein.

DETAILED DESCRIPTION

Figure 1:
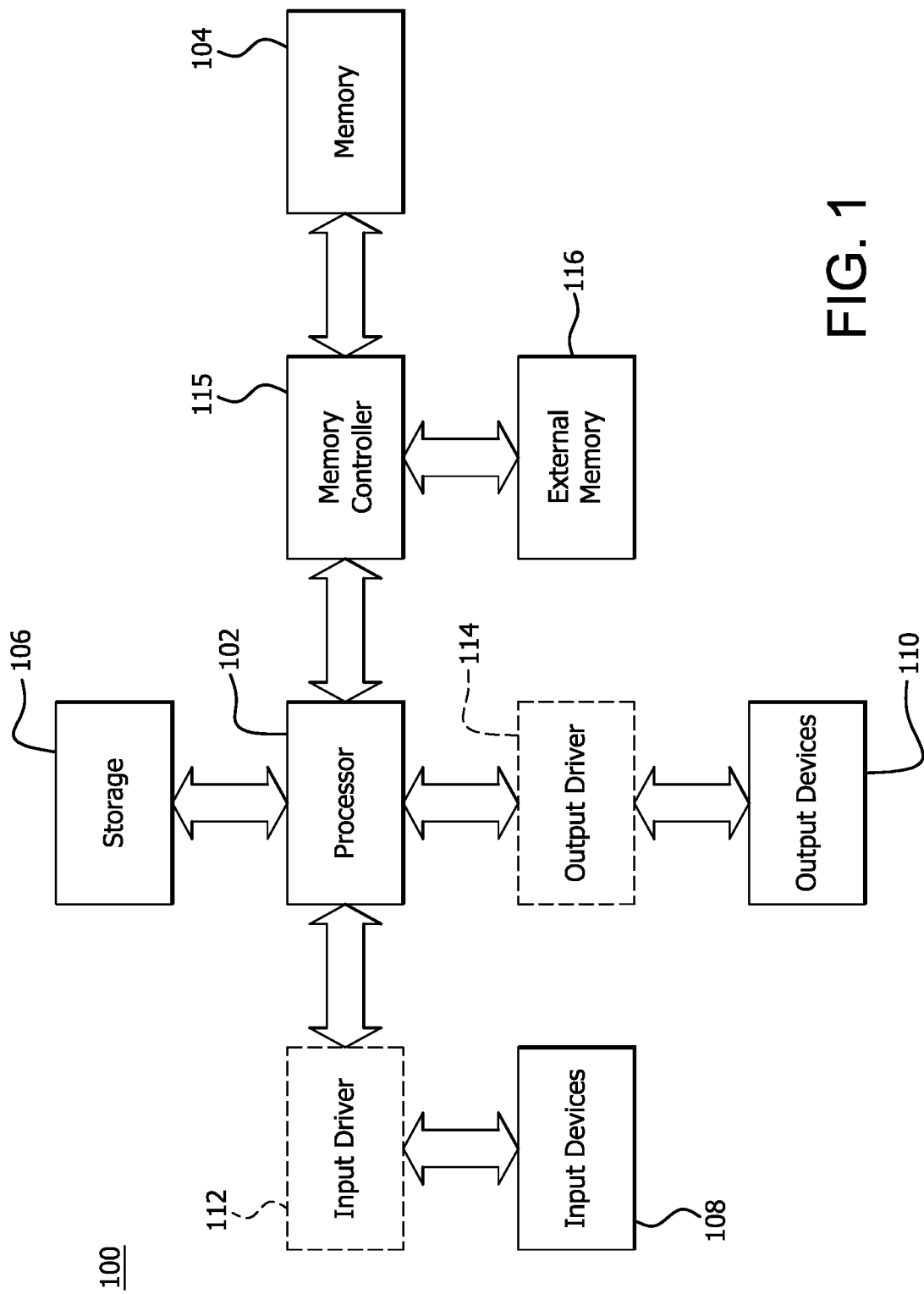
FIG. 1 is a block diagram of an example device in which one or more features of the disclosure can be implemented.

Although the method and apparatus will be expanded upon in further detail below, briefly a method for mitigating a memory attack is described herein.

When a page is allocated in memory, such as a dynamic random access memory (DRAM), the device controller internally checks if an aggressor-victim pair exists within that operating system (OS)-visible page. If such a pair is detected, the DRAM notifies the system via a register (e.g., an ADJACENT_ROW register) that contains the base address of the page that was just allocated. The system software uses this information to un-map this physical page and remap it elsewhere that the DRAM device deems to be safe, or repair/replace the affected portion of the physical page (e.g. a DRAM row).

This adjacency check can also be explicitly triggered via a command (e.g., a CHECK_ADJACENCY command) at runtime so that the memory controller can check if a potential rowhammer vulnerability has arisen, which system software can then use to trigger a page retirement. Such checks could be integrated as part of a periodic security scan implemented by the OS/hypervisor. Additionally, a new x86 instruction (e.g., a SECURITY_CHECK instruction) can be added that issues the adjacency check to all DRAM devices that store data for this page based on the memory interleaving configuration of the system. However, although the use of x86 instructions are described for example purposes, any instruction set architecture (ISA) instructions may be utilized to carry out the steps of the method described below.

As rowhammer is a critical DRAM fault mode that can impact the security computer systems, an incremental change to the DRAM system on chip (SoC) interface is described herein to provide a defense against this fault mode. Accordingly, the DRAM can provide insight to the system about physical row adjacency in a page so that the proactive actions can be taken to reduce the risk of a rowhammer exploit before that page is made available to the user.

A method for memory attack mitigation in a memory device includes receiving, at a memory controller, an allocation of a page in memory. One or more device controllers detect an aggressor-victim set within the memory. Based upon the detection, an address of the allocated page is identified for further action.

A system for memory attack mitigation includes a memory including a device controller, a memory controller operatively coupled with and in communication with the device controller, and a processor operatively coupled with and in communication with the memory controller. The memory controller is configured to receive an allocation of a page in memory. The device controller detects an aggressor-victim set within the memory, and based upon the detection, the memory controller identifies an address of the allocated page in memory for further action.

A non-transitory computer-readable medium for memory attack mitigation, the non-transitory computer-readable medium having instructions recorded thereon, that when executed by the processor, cause the processor to perform operations. The operations include receiving, at a memory controller, an allocation of a page in memory. One or more device controllers detect an aggressor-victim set within the memory. Based upon the detection, an address of the allocated page is identified for further action.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. In some embodiments, memory controller 115 will be included within processor 102. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, DRAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
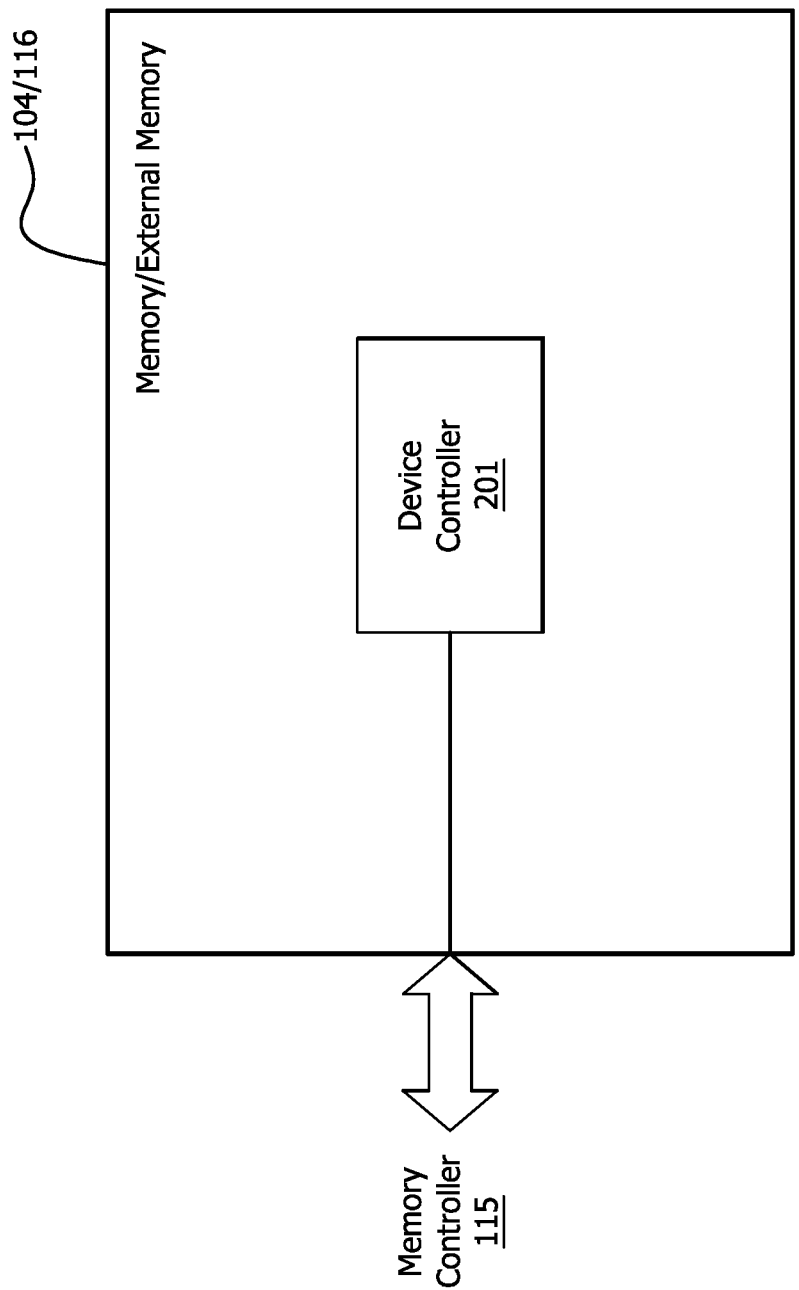
FIG. 2 is a block diagram of an example memory in which one or more of the features of the disclosure can be implemented.

FIG. 2 is a block diagram of an example memory 104 or external memory 116 in which one or more of the features of the disclosure can be implemented. The memory 104/116 includes a device controller 201. The device controller 201 is in communication with the processor 102 and the memory controller 115. The device controller 201 may be implemented as hardware or software within the memory 104 or external memory 116. As shown in FIG. 2, the device controller 201 resides in the memory 104 or external memory 116. However, it should be noted that the device controller 201 may reside elsewhere. Accordingly, the device controller 201 may perform the functionality of the method 300 described below. In addition, although not shown, separate processing logic may be provided in the memory controller 115, memory 104, external memory 116 or elsewhere in communication with in order to receive data.

Figure 3:
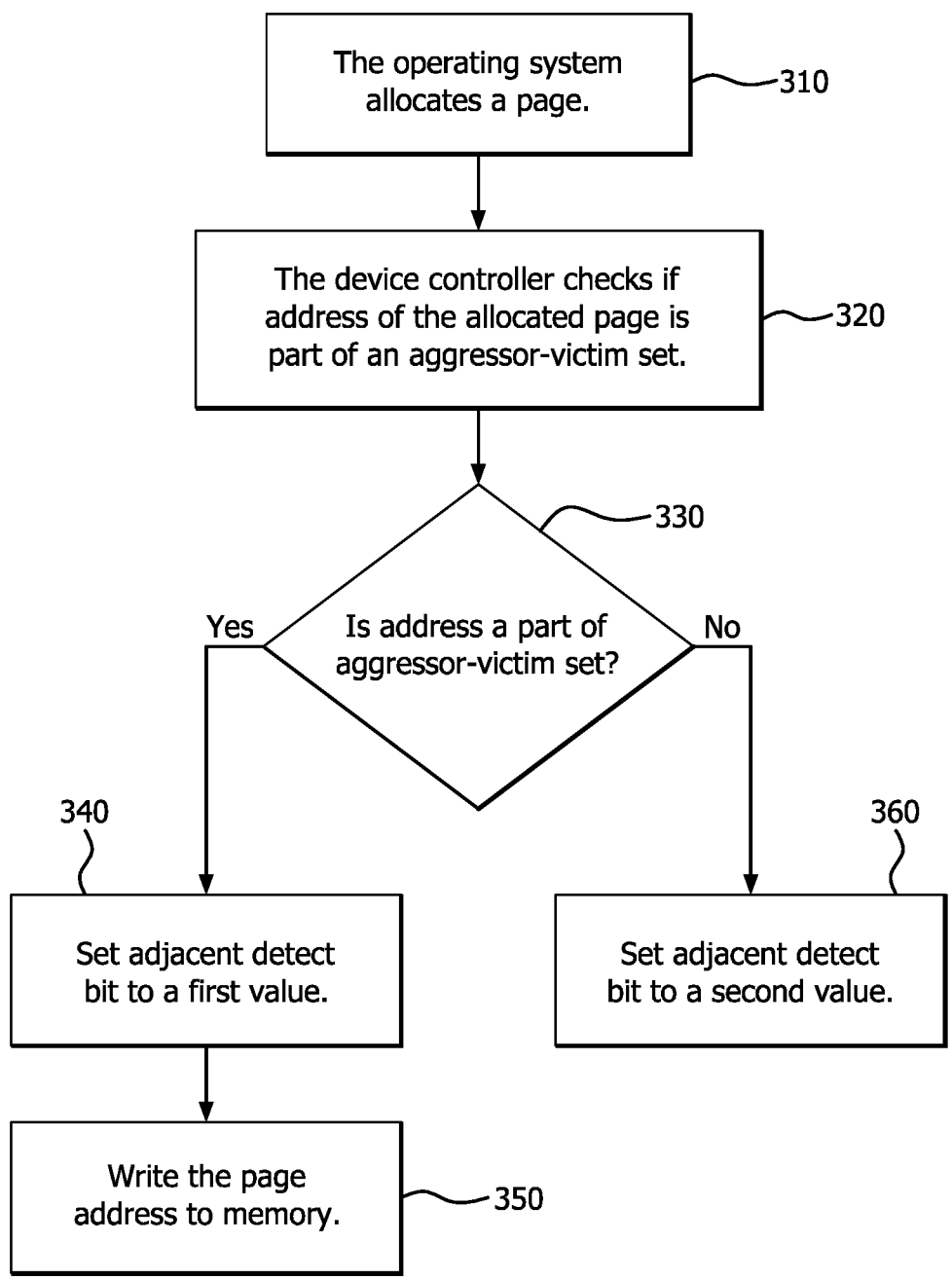
FIG. 3 is a flow diagram of an example method of a memory attack mitigation.

In accordance with the device 100 and memory controller 115 depicted in FIGS. 1 and 2, FIG. 3 is a flow diagram of an example method 300 of a memory attack mitigation.

In step 310, the operating system on the computer allocates a page. The memory controller checks if the address of the allocated page is part of an aggressor-victim set (step 320). For example, when the OS/hypervisor allocates a page in DRAM, the OS issues an instruction, such as the security check instruction and provides the first (e.g. 4 KB-aligned) system physical address of the page as input to this instruction. Alternatively, the OS may issue the security check instruction to all cache lines in the page.

The memory controller executes the security check instruction by issuing a check adjacency command to all DRAM devices that store data in the page (e.g., the 4 KB page), along with the appropriate address (e.g., PAGE_BASE_ADDR). The memory controller accounts for configurations such as memory interleaving to ensure that the check adjacency command is issued to the device controllers of all affected DRAM devices and performs any necessary address translations (e.g., if the addresses seen by the DRAM are not system physical addresses). The device controller may check for the potential aggressor-victim physical row pairs within that page in step 320 through a Target Row Refresh (TRR) routine, or utilizing any tracking routine used to track aggressor-victim pairs.

If the address is a part of the aggressor-victim set (step 330), then an adjacent detect bit is set to a first value (step 340). For example, the ADJ_DETECT bit is set to '1'. Additionally, the page address is written to memory (step 350). That is, the base address of that page is written to the PAGE_BASE_ADDR register, where the PAGE_BASE_ADDR is a register that contains the address to notify a host. Accordingly, the memory controller and the OS are aware there is a potential vulnerability in memory at that location.

If the address is not part of the aggressor-victim set (step 330), then the adjacent detect bit is set to a second value (step 360). For example, the ADJ_DETECT bit is set to '0'.

A return value may be created by the memory controller as the logical OR of all the ADJ_DETECT bits in the affected DRAM devices, and this value may be returned as the result of the security check instruction (e.g. in the carry flag). Additional action can then be undertaken by the OS based upon this information.

For example, the physical address may be un-mapped and remapped elsewhere. Alternatively, an error can be returned to the user. If a remap is attempted, method 300 above may be performed again to check if the new page allocation is deemed safe from rowhammer by the DRAM device.

Additionally, or alternatively, the OS actions described above may be performed by the processor 102 itself, (e.g. x86 microcode, on a translation lookaside buffer (TLB) miss or on a return from a page fault), for example. A hardware action may be triggered, (e.g. a page repair or a second page fault to the OS with a unique code).

System software may execute the security check instruction as part of a periodic security scan of the system, where the OS or hypervisor can choose to retire that DRAM page to reduce the risk of rowhammer bit flips in that page.

The security check instruction may also be available in a user application or virtual machine (VM), and not to the system software/hypervisor (e.g. in circumstances where the user application or VM is the trusted entity). Because the security check instruction only returns whether a virtual address allocated to that application/VM is a victim, and not information about which other addresses or VMs are the aggressor or whether the page itself is an aggressor, a VM can check its own security and choose whether to take action based on potential page vulnerabilities without compromising security for other applications/VMs.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for memory attack mitigation in a memory device, comprising:
   receiving, at a memory controller, an allocation of a page in memory;
   setting, by the one or more device controllers, an adjacent detect bit based on an address of the allocated page in memory being part of an aggressor-victim set within the memory; and
   identifying the address of the allocated page in memory for further action.

2. The method of claim 1 wherein the memory controller receives a security check instruction along with the allocation of the page in memory.

3. The method of claim 2 wherein the memory controller issues an adjacency check to the one or more device controllers based upon the respective memory associated with the device controller storing data in the received allocated page and memory address.

4. The method of claim 1, further comprising the memory controller translating memory addresses.

5. The method of claim 1 wherein the one or more device controllers checks to determine if the address of the allocated page is part of an aggressor-victim set in memory using a tracking routine.

6. The method of claim 1, wherein the adjacent detect bit is set to a first value upon a determination that the address of the allocated page is part of an aggressor-victim set in memory.

7. The method of claim 6, further comprising the one or more device controllers writing the address of the page to memory.

8. The method of claim 1, wherein the adjacent detect bit is set to a second value upon a determination that the address of the allocated page is not part of an aggressor-victim set in memory.

9. The method of claim 1, further comprising transmitting, by the memory controller, an indication identifying all memory devices affected by an aggressor-victim set.

10. The method of claim 1 wherein a page repair is instituted based upon a determination that the address of the allocated page is part of an aggressor-victim set in memory.

11. A system for memory attack mitigation, comprising:
    a memory including a device controller;
    a memory controller operatively coupled with and in communication with the device controller; and
    a processor operatively coupled with and in communication with the memory controller,
    wherein the memory controller is configured to receive an allocation of a page in memory,
    wherein the device controller is configured to set an adjacent detect bit based on an address of the allocated page in memory being part of an aggressor-victim set within the memory; and
    wherein, the memory controller is configured to identify the address of the allocated page in memory for further action.

12. The system of claim 11 wherein the memory controller is configured to receive a security check instruction along with the allocation of the page in memory.

13. The system of claim 12 wherein the memory controller is configured to issue an adjacency check to the device controller based upon the respective memory associated with the device controller storing data in the received allocated page and memory address.

14. The system of claim 11, wherein the memory controller is configured to translate memory addresses.

15. The system of claim 11 wherein the device controller is configured to check to determine if the address of the allocated page is part of an aggressor-victim set in memory using a tracking routine.

16. The system of claim 11, wherein the device controller is configured to set the adjacent detect bit to a first value upon a determination that the address of the allocated page is part of an aggressor-victim set in memory.

17. The system of claim 16, wherein the device controller is configured to write the address of the page to memory.

18. The system of claim 11, wherein the device controller is configured to set the adjacent detect bit to a second value upon a determination that the address of the allocated page is not part of an aggressor-victim set in memory.

19. The system of claim 11, wherein the memory controller is configured to transmit an indication identifying all memory devices affected by an aggressor-victim set.

20. A non-transitory computer-readable medium for memory attack mitigation, the non-transitory computer-readable medium having instructions recorded thereon, that when executed by a processor, cause the processor to perform operations including:
    receiving, at a memory controller, an allocation of a page in memory;
    setting, by the one or more device controllers, an adjacent detect bit based on an address of the allocated page in memory being part of an aggressor-victim set within the memory; and
    identifying the address of the allocated page in memory for further action.

* * * * *